(12) United States Patent
Ungchusri et al.

(10) Patent No.: US 6,371,527 B1
(45) Date of Patent: Apr. 16, 2002

(54) SWIVEL JOINT WITH STEPPED BEARING RACES

(75) Inventors: Tep Ungchusri, Woodlands; Sergio A. Castillo, Spring, both of TX (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/703,575

(22) Filed: Nov. 1, 2000

Related U.S. Application Data

(63) Continuation of application No. 08/742,520, filed on Nov. 1, 1996, now Pat. No. 6,164,707, which is a continuation of application No. 08/260,160, filed on Jun. 15, 1994, now abandoned.

(51) Int. Cl.[7] .............................................. F16L 27/04
(52) U.S. Cl. ...................................................... 285/276
(58) Field of Search ............................... 285/276, 121.2, 285/121.3, 121.4, 121.5, 121.6, 98; 384/512

(56) References Cited

U.S. PATENT DOCUMENTS

| | | | | |
|---|---|---|---|---|
| 633,798 A | * | 9/1899 | Carley | 384/512 |
| 990,946 A | * | 5/1911 | Badger | 384/512 |
| 1,325,113 A | * | 12/1919 | Rohn | 384/512 |
| 1,452,603 A | * | 4/1923 | Himes | 384/512 |
| 2,499,837 A | * | 3/1950 | Sheets et al. | 384/512 |
| 3,142,498 A | * | 7/1964 | Press | 285/276 |
| 4,418,947 A | * | 12/1983 | Talafuse | 285/168 |
| 5,118,205 A | * | 6/1992 | Hoffmann | 384/512 |
| 5,226,737 A | * | 7/1993 | Sandy, Jr. | 384/512 |
| 6,164,707 A | * | 12/2000 | Ungchusri et al. | 285/276 |

FOREIGN PATENT DOCUMENTS

| | | | | |
|---|---|---|---|---|
| DE | 35032215 | * | 8/1986 | 384/512 |
| GB | 19089 | * | 11/1889 | 384/512 |
| GB | 174917 | * | 3/1922 | 384/512 |
| GB | 2643458 | * | 12/1926 | 384/512 |
| GB | 983980 | * | 2/1965 | 384/512 |

* cited by examiner

*Primary Examiner*—Eric K. Nicholson
(74) *Attorney, Agent, or Firm*—Henry C. Query, Jr.

(57) ABSTRACT

The present invention is directed to a swivel joint for fluid conduits which comprises a central axis; a tubular male member having an outer annular surface, a first end and at least first and second outer annular grooves formed on the outer surface coaxial with the central axis; a tubular female member having an inner annular recess, an annular shoulder formed at an inner end of the recess and at least first and second inner annular grooves formed on the recess coaxial with the central axis; wherein the outer surface of the male member is adapted to be received in the recess of the female member such that the first end is disposed proximate the shoulder and each outer groove is aligned with a corresponding inner groove to thereby define at least first and second annular races; a plurality of balls disposed in each race to secure said male and female members together and to facilitate relative rotation of the male and female members about the central axis; wherein the radius of each race as measured from the central axis is greater than the radius of each adjacent race closer to the first end of the male member; and wherein the number of balls in each race is one more than the number of balls in each adjacent race closer to the first end.

18 Claims, 3 Drawing Sheets

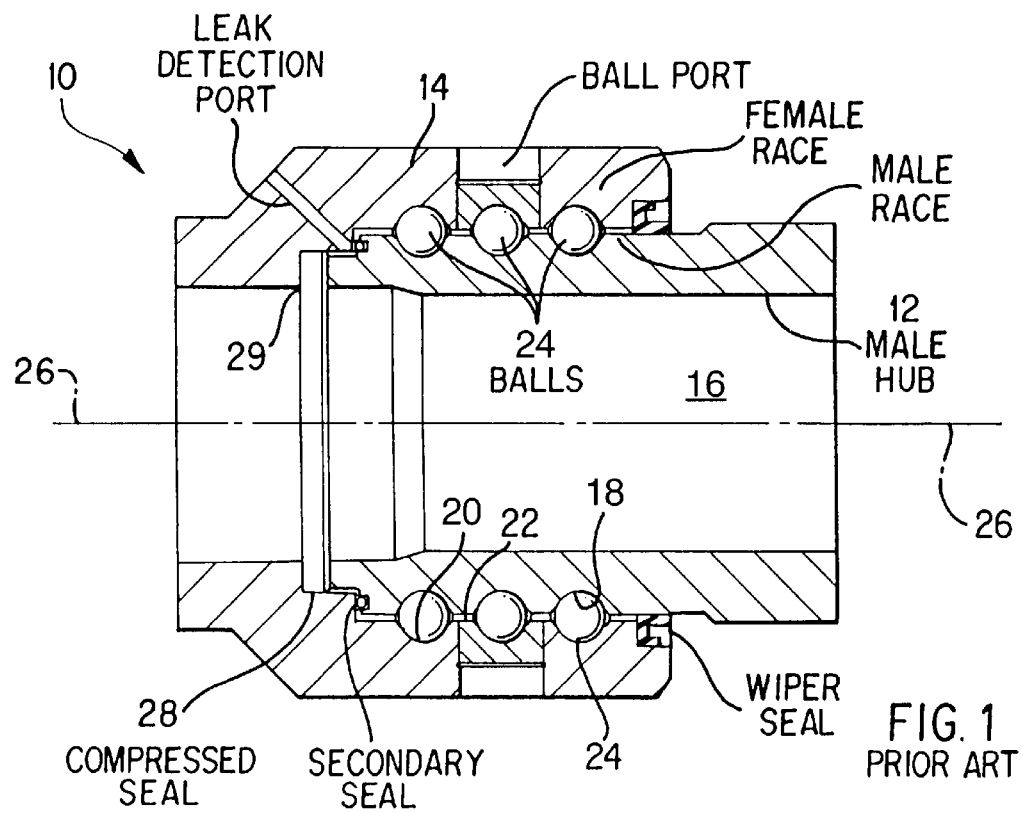
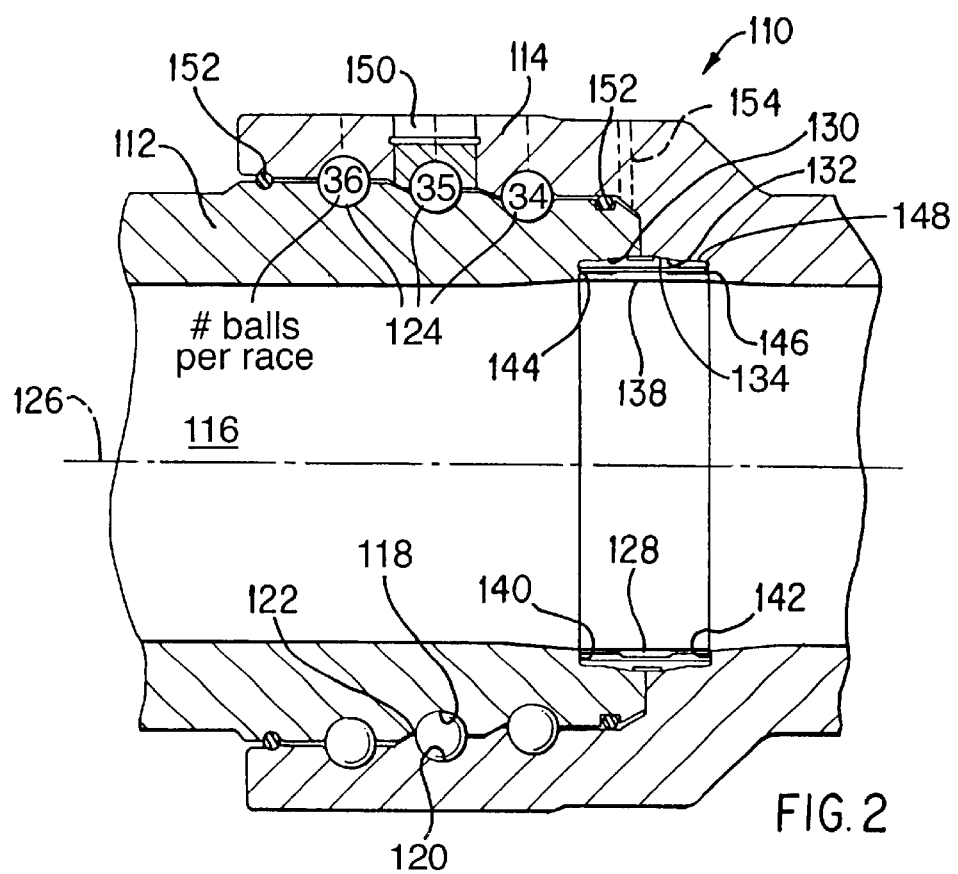

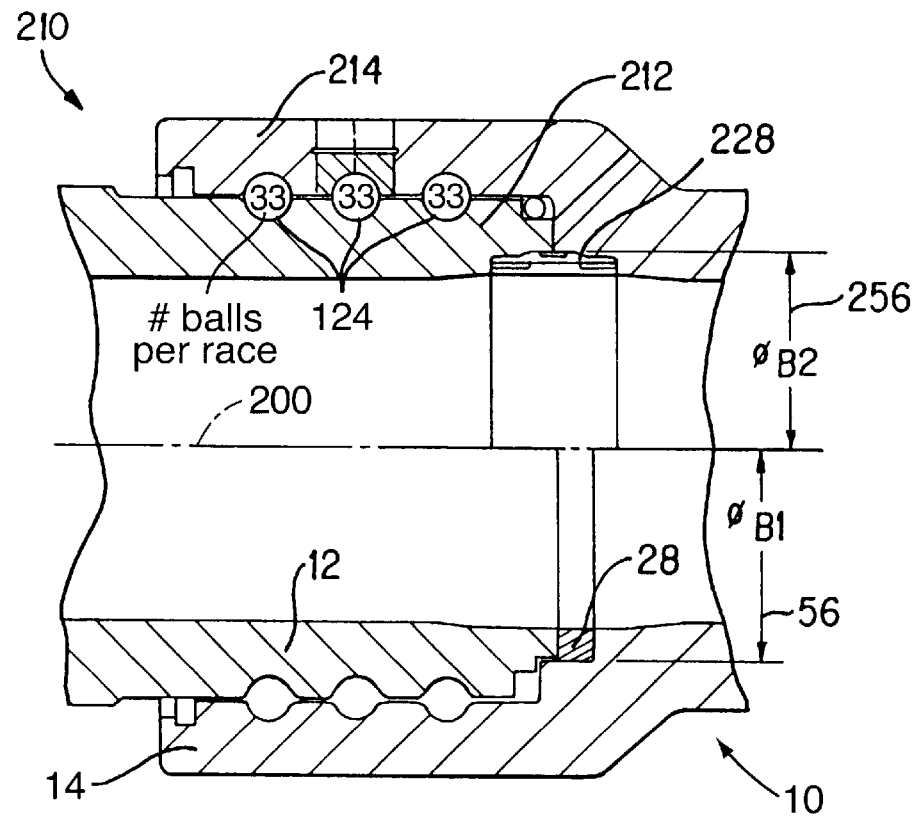
FIG. 3b
FIG. 3a PRIOR ART
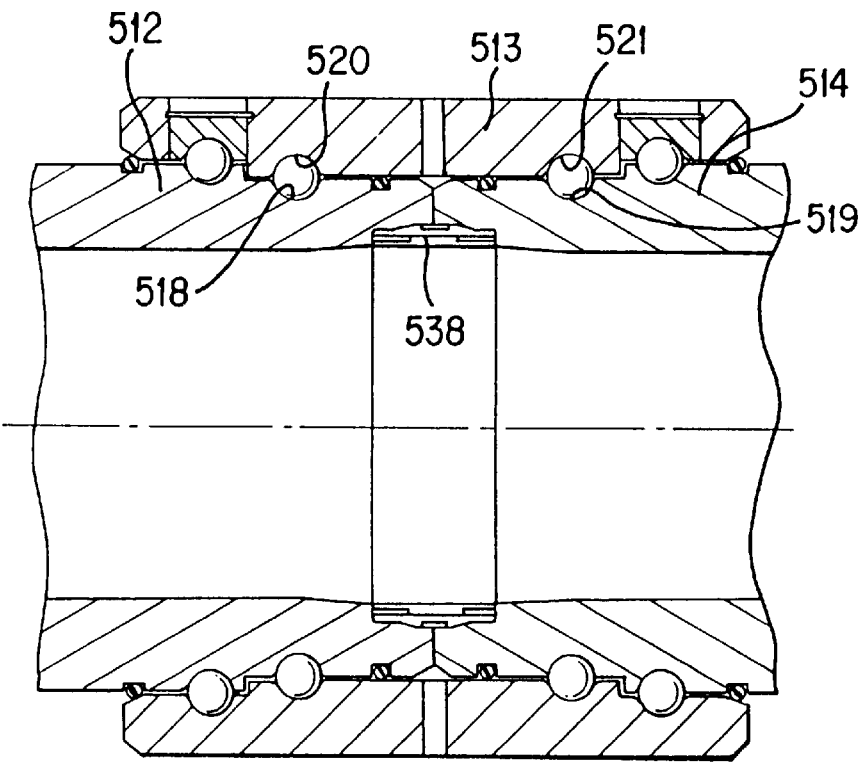
FIG. 5

SWIVEL JOINT WITH STEPPED BEARING RACES

This application is a continuation of U.S. patent application Ser. No. 08/742,520 filed on Nov. 1, 1996, now U.S. Pat. No. 6,164,707, which is a continuation of U.S. patent application Ser. No. 08/260,160 filed on Jun. 15, 1994, now abandoned, both of which applications are hereby incorporated herein by reference.

BACKGROUND OF THE INVENTION

The present invention relates to a swivel joint and, more particularly, to a swivel joint having stepped bearing races.

Swivel joints are used to connect fluid pipes in oilfields and in other applications. Swivel joints are generally comprised of interfitting male and female members rotatably connected by a bearing assembly. Typically, inner and outer grooves are incorporated in the male and female members to form a bearing race, and a plurality of ball bearings are housed within the race. Higher demand for compatibility with increased service pressure, wider operating temperature range, and a greater variety of corrosive chemicals has resulted in swivel joint designs with multiple bearing races rather than one bearing race. Even with multiple bearing races high pressures can sometimes cause deformation or brinelling of the bearing races. Such brinelling relaxes the compression of the seal between the male and female members and causes the seal to leak, preventing the swivel joint from swiveling smoothly under pressure and reducing the bearing race life significantly. In addition, erosive wear in the male member under the bearing race can quickly reduce the integrity of the swivel joint.

SUMMARY OF THE INVENTION

The present invention provides a swivel joint having two or more bearing races situated in a stepped relationship wherein each bearing race is positioned coaxially with respect to and has an incrementally greater radius than the next adjacent bearing race closer to the end of the male member which engages the female member. The radius of each bearing race is preferably determined as a function of the radius of the ball bearings and the cross sectional areas of the male and female members at the bearing race. In a preferred embodiment of the invention, the radius of each race is determined such that the number of balls in each race is one more than the number of balls in the adjacent race closer the end of the male member which engages the female member.

The present invention improves sealing under extreme conditions and specifically eliminates bearing race brinelling at pressures much greater than is attained with conventional or known swivel joints with minimal increase in weight and cost. This stepped configuration more equally distributes hydrostatic end loading to each bearing race section, enabling maximum total end loading while minimizing load concentration on a particular bearing race. In addition, the stepped configuration permits the male member to have a relatively larger cross section under the bearing race without increasing the overall diameter of the swivel joint, which enables the male member to withstand a relatively greater amount erosive wear and thereby improves the overall integrity of the swivel joint.

BRIEF DESCRIPTION OF THE DRAWINGS

FIG. 1 is a partial cross-sectional view of a prior art swivel joint having three bearing races;

FIG. 2 is a partial cross-sectional view of a swivel joint of the present invention having three stepped bearing races;

FIG. 3a is an enlarged, partial cross-sectional view of the prior art swivel joint of FIG. 1;

FIG. 3b is an enlarged, partial cross-sectional view of another embodiment of a swivel joint of the present invention having a straight bore seal;

FIG. 5 is a partial cross-sectional view of another embodiment of a swivel joint of the present invention.

DETAILED DESCRIPTION OF THE PREFERRED EMBODIMENTS

Figure 4A:
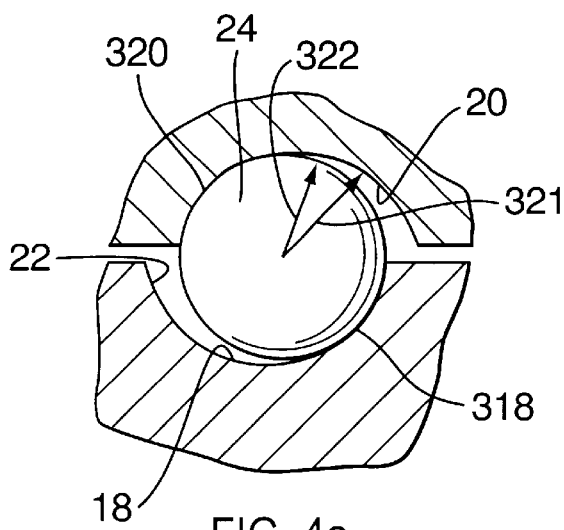
FIG. 4a is an enlarged, cross-sectional view of a ball bearing race in a prior art swivel joint.

FIG. 1 shows a known, prior art swivel joint 10 having a male connector 12 rotatably received inside of a female connector 14. A sealed fluid flow passage 16 is formed therethrough, in communication with fluid conduits or pipes (not shown) extending from each connector. Each connector 12, 14 has respectively formed thereon a plurality of annular grooves 18, 20. When the connectors 12 and 14 are inserted together, the grooves 18 and 20 align with each other forming annular bearing races 22. A plurality of ball bearings 24 are housed in each race 22 to provide bearing support and to enable swiveling of the connectors 12, 14 relative to each other. The races 22 and ball bearings 24 are coaxially positioned around a center axis 26 of the flow passage 16. The races 22 all have substantially the same radius. An annular elastomer compression seal 28 is positioned between axial faces of the male connector 12 and the female connector 14 to prevent fluid flow therebetween. The compression seal 28 is pre-stressed.

When fluid under pressure is introduced into the flow passage 16 there results a hydrostatic end load causing the male and female connectors 12, 14 to be biased axially away from each other. The ball bearings 24 are then subject to axial resultant forces which are transmitted through contact surfaces between the ball bearings 24 and the races 22. The resultant force to which each bearing race 22 is subject is distributed in relation to the relative position of each race. For instance, the male member groove 18 closest to the seal 28 is subject to a first load, the second groove is subject to a second load which is cumulative of the first load, and so on. Thus, with each successive bearing race 22 moving away from the seal 28, the cumulative load on the male member groove 18 increases. The female connector 14 is subject to analogous loading, with the race closest to the seal bearing the greatest cumulative load.

In a typical tri-race bearing assembly 10 as shown in FIG. 1, the load distribution for each race 22 beginning with that closest to the seal 28 is approximately 47%, 31% and 22%. It is desirable then to distribute the load more equally so as to reduce the load on the first race without reducing the overall load bearing capacity of the bearing assembly. The present invention accomplishes this through the stepped configuration.

The first embodiment of the present invention is shown in FIG. 2. A swivel joint 110 has a male connector 112 rotatably received inside of a female connector 114. A sealed fluid flow passage 116 is formed therethrough, in communication with fluid conduits or pipes (not shown) extending from each connector. Each connector 112, 114 has respectively formed thereon a plurality of annular grooves 118, 120. When the connectors 112 and 114 are inserted together, the grooves 118 and 120 align with each other forming annular bearing races 122. A plurality of ball bearings 124 are housed in each race 122 to provide bearing support and to enable swiveling of the connectors 112, 114 relative to each other. The races 122 and ball bearings 124 are coaxially positioned around a central axis 126 of the flow passage 116.

The present invention provides for a stepped arrangement wherein the radii of the bearing races 122 increase progressively in consecutive races 122 in a direction moving away from the male connector end which contacts the female connector 114. This stepped design more uniformly distributes loading per ball bearing 124 by more uniformly distributing tensile stress across each hub section at each respective race 122. The number of steps can vary from two or more and there can be one or more races per step. The radius of each bearing race, as measured from the central axis 126, is preferably determined as a function of the cross-sectional areas of the male and female connectors at the race, the maximum end load which the swivel joint 110 is designed to accommodate, and the diameter of the balls 124. The radii of the bearing races are calculated to distribute the end load more evenly among the bearing races than in the prior art swivel joint of FIG. 1. It is desirable, though not required, that the ball bearings 124 are of uniform size throughout the assembly 110 and, thus, each race 122 will contain a different number of ball bearings 124.

In the embodiment of the invention wherein the diameter of all the balls 124 is the same, the radius of each bearing race 122 is preferably determined such that the number of balls in each race is one more than the number of balls in each adjacent race closer to the male connector end which contacts the female connector 114. The increase in the radius of each consecutive bearing race 122 necessary to accommodate one additional ball 124 has been found to be sufficient to distribute the hydrostatic end load more evenly over the bearing races. As is known in the art, the number of balls of a given diameter which can be accommodated in a bearing race depends on the circumference of the bearing race. Conversely, given a desired number of balls of a certain diameter, the required circumference of the bearing race can be determined. Thus, once the radius of the bearing race 122 closest to the male connector end which contacts the female connector has been determined, the radii of the remaining bearing races can be determined. For example, in the exemplary 2¾" swivel joint 110 shown in FIG. 2, the balls 124 are each ⅜" in diameter and the first bearing race 122 closest to the male connector end houses 34 balls, the second bearing race houses 35 balls and the third bearing race houses 36 balls.

The present invention utilizes a straight bore seal 128 of the type disclosed in U.S. Pat. No. 4,930,791 made of non-metallic compositions such as "TEFLON" having different properties than conventional elastomer compression seals such as the seal 28 of FIG. 1. Conventional elastomer seal materials have inherent limitations with respect to fluid compatibility, temperature range, and rupture. The axial ends of the male and female connectors 112, 114 have recessed sections 130 and 132, respectively, which form one recessed groove 134 when the connectors 112, 114 are fitted together as shown in FIG. 2. The straight bore seal 128 is received therein such that the inner circumferential surface 138 of the seal 128 is flush with the inner surface of the flow passage 116. The recessed sections 130 and 132 have axial end portions 140 and 142 facing toward each other which receive the axial ends of the straight bore seal 128. The end portions 140 and 142 are engaged by axial ends 144 and 146 of the straight bore seal 128. The outer circumferential surface 148 forms a seal with the inner circumferential surface of the groove 134. Because the geometry and material of the straight bore seal 128 allows a substantially smaller cross-sectional area than a comparable capacity conventional elastomer seal 28, hydrostatic end loading and, thus, contact force between each ball bearing 124 and race 122 are reduced significantly, resulting in less brinelling of the race 122. The assembly 110 embodied in FIG. 2 further includes a ball bearing port 150 and secondary elastomer O-ring or other suitable seals 152. A leak detection port 154 is also provided.

In order to further illustrate the novelty of the present invention, FIGS. 3a and 3b show the prior art assembly 10 of FIG. 1 juxtaposed with a second embodiment 210 of the present invention assembly along centerline 200. Because the straight bore seal 228 has a lower seal profile than the conventional seal 28, the sealing radius 256 of the present invention is smaller than the sealing radius 56 of the conventional seal 28. This results in a smaller area of the connectors subject to hydrostatic pressure and, thus, a reduced hydrostatic end load. While the conventional seal 28 is subject to pre-stress axial compression, the straight bore seal 228 is free of axial loading. Thus, axial forces between the connectors and the seal 228 are generally non-existent, while the conventional seal 28 contacts the female connector 14 on inner circumferential and axial surfaces and contacts the male connector 12 on an axial surface.

Figure 6:
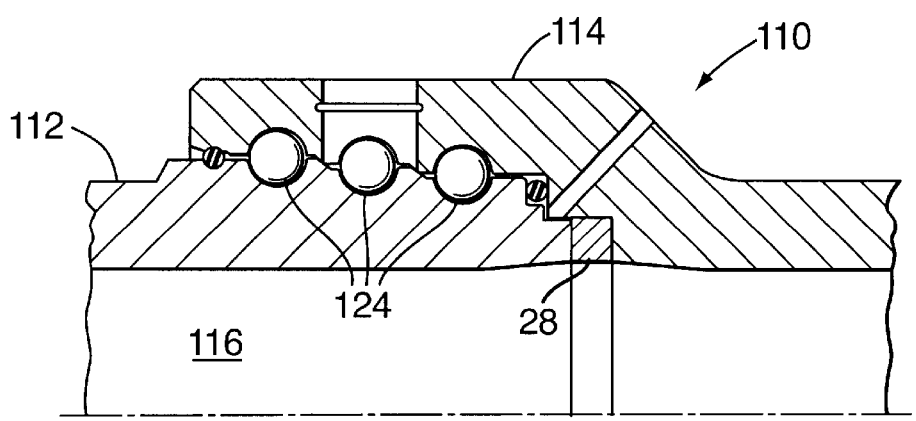
FIG. 6 is a partial cross-sectional view of the swivel joint of FIG. 2, but having the bore seal depicted in FIG. 1.

Referring to FIG. 6, however, the swivel joint 110, which includes a stepped bearing arrangement in accordance with the present invention, can comprise a conventional seal 28 to seal between the male and female connectors 112, 114. The seal 28 has several features which may make it more suitable than the straight bore seal 128 for certain applications.

FIG. 4a illustrates a conventional bearing arrangement subject to hydrostatic loading in which a ball bearing 24 is received in a race 22 formed by male and female connector grooves 18, 20. Typical bearing races such as the one illustrated in FIG. 4a are machined as grooves 18,20 having a constant radius 321. The groove radius 321 must be greater than the radius 322 of the ball bearings to the extent that assembly is possible. This results in concentrated contact areas 318,320 when the connectors shift under axial load. Such load concentrations subject the races to brinelling.

Figure 4B:
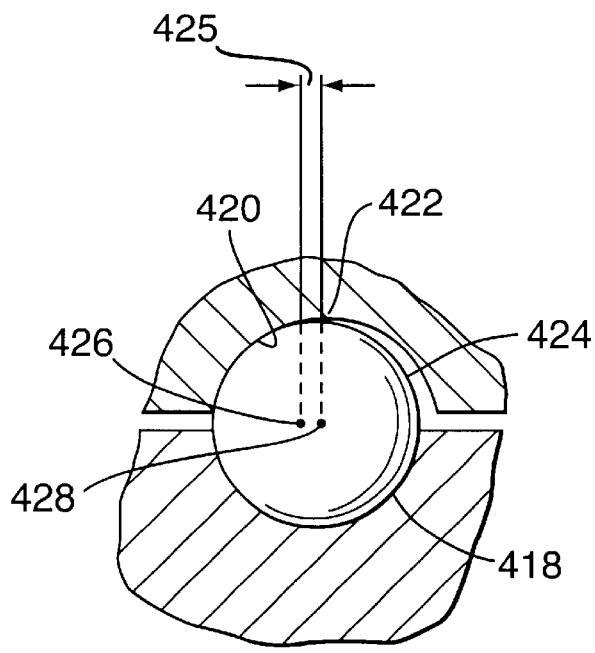
FIG. 4b is an enlarged, cross-sectional view of a ball bearing race in a swivel joint according to another embodiment of the present invention.

In order to reduce concentration of contact areas as described above, the present invention provides grooves having offset radii as illustrated in FIG. 4b. As shown in FIG. 4b, the female connector groove 420 is formed with substantially the same radius as the ball bearing 424 except that at the apex 422 of the groove 420 there is a straight line portion 425 formed by offsetting the center point 426 of the radius of the groove 420 to an offset center point 428. Thus the groove 420 does not form, in profile, a perfect half circle due to the straight line portion 425 on the perimeter of the groove at the apex 422. The male connector groove 418 can be formed with substantially the same radius as the ball bearing 424. This design provides enough clearance to facilitate assembly while maximizing the contact areas between the ball bearing 424 and the respective grooves 418,420, thereby minimizing brinelling. Either connector groove for an individual race can have the offset radius feature, or both grooves can have a reduced offset distance.

FIG. 5 illustrates a third embodiment of the invention utilizing the stepped configuration illustrated in the embodiment of FIG. 2, having connectors 512,514 that are placed end to end and joined by a collar 513 which fits around the connectors 512,514. Each connector 512,514 has a plurality of stepped grooves 518,519 corresponding to a plurality of stepped grooves 520,521 in the collar 513. A single straight bore seal 538 is utilized. The embodiment herein operates essentially the same way and utilizes essentially the same features as the first embodiment described in FIG. 2.

Although the best mode contemplated for carrying out the invention has been herein shown and described, it is understood that modifications and variations may be made without departing from what is regarded as the subject matter of the invention.

What is claimed is:

1. A swivel joint comprising:
    a central axis;
    a tubular male member having an outer annular surface, a first end and at least first and second outer annular grooves formed on the outer surface coaxial with the central axis;
    a tubular female member having an inner annular recess, an annular shoulder formed at an inner end of the recess and at least first and second inner annular grooves formed on the recess coaxial with the central axis;
    wherein the outer surface of the male member is adapted to be received in the recess of the female member such that the first end is disposed proximate the shoulder and each outer groove is aligned with a corresponding inner groove to thereby define at least first and second annular races;
    a plurality of balls disposed in each race to secure said male and female members together and to facilitate relative rotation of the male and female members about the central axis;
    wherein the radius of each race as measured from the central axis is greater than the radius of each adjacent race closer to the first end of the male member; and
    wherein the number of balls in each race is just one more than the number of balls in each adjacent race closer to the first end.

2. The swivel joint of claim 1, further comprising means for sealing between the male and female members.

3. The swivel joint of claim 2, wherein the sealing means comprises an annular seal disposed between the first end of the male member and the shoulder of the female member.

4. The swivel joint of claim 3, wherein the annular seal is comprised of an elastomer.

5. The swivel joint of claim 2, wherein the sealing means comprises a straight bore seal which is disposed in a seal pocket formed in adjacent portions of the male and female members.

6. The swivel joint of claim 1:
    wherein the cross section of at least each outer groove or each inner groove comprises first and second arcuate segments each having a distinct centerpoint and substantially the same radius;
    wherein the centerpoint of the first segment is offset from the centerpoint of the second segment in a direction parallel to the central axis; and
    wherein the radius of the first and second segments is substantially the same as the radius of the balls.

7. A swivel joint comprising:
    a central axis;
    a tubular male member having an outer annular surface, a first end and at least first and second outer annular grooves formed on the outer surface coaxial with the central axis;
    a tubular female member having an inner annular recess, an annular shoulder formed at an inner end of the recess and at least first and second inner annular grooves formed on the recess coaxial with the central axis;
    wherein the outer surface of the male member is adapted to be received in the recess of the female member such that the first end is disposed proximate the shoulder and each outer groove is aligned with a corresponding inner groove to thereby define at least first and second annular races;
    a plurality of balls disposed in each race to secure said male and female members together and to facilitate relative rotation of the male and female members about the central axis;
    wherein the radius of each race as measured from the central axis is greater than the radius of each adjacent race closer to the first end of the male member by an amount sufficient to enable each race to accommodate just one more ball than is disposed in the adjacent race.

8. The swivel joint of claim 7, further comprising means for sealing between the male and female members.

9. The swivel joint of claim 8, wherein the sealing means comprises an annular seal disposed between the first end of the male member and the shoulder of the female member.

10. The swivel joint of claim 9, wherein the annular seal is comprised of an elastomer.

11. The swivel joint of claim 8, wherein the sealing means comprises a straight bore seal which is disposed in a seal pocket formed in adjacent portions of the male and female members.

12. The swivel joint of claim 7:
    wherein the cross section of at least each outer groove or each inner groove comprises first and second arcuate segments each having a distinct centerpoint and substantially the same radius;
    wherein the centerpoint of the first segment is offset from the centerpoint of the second segment in a direction parallel to the central axis; and
    wherein the radius of the first and second segments is substantially the same as the radius of the balls.

13. A swivel joint comprising:
    a central axis;
    a pair of tubular members each having a first end and a plurality of outer annular grooves formed coaxial with the central axis;
    a collar member comprising a pair of inner cylindrical recesses each having a plurality of inner annular grooves formed coaxial with the central axis;
    wherein each tubular member is adapted to be received in a corresponding recess of the collar member such that the first ends are proximate one another and each outer groove is aligned with a corresponding inner groove to thereby define a plurality of annular races;
    a plurality of balls disposed in each race to secure said tubular members in said collar and to facilitate relative rotation of the tubular members about the central axis;

wherein the radius of each race as measured from the central axis is greater than the radius of each adjacent race closer to the first ends of the tubular members; and wherein the number of balls in each race is just one more than the number of balls in each adjacent race closer to the first ends of the tubular members.

14. The swivel joint of claim 13, further comprising means for sealing between each tubular member and the collar member.

15. The swivel joint of claim 14, wherein the sealing means comprises an annular seal disposed between the first ends of the tubular members.

16. The swivel joint of claim 15, wherein the annular seal is comprised of an elastomer.

17. The swivel joint of claim 14, wherein the sealing means comprises a straight bore seal which is disposed in a seal pocket formed in adjacent portions of the first ends of the tubular members.

18. The swivel joint of claim 13:

wherein the cross section of at least each outer groove or each inner groove comprises first and second arcuate segments each having a distinct centerpoint and substantially the same radius;

wherein the centerpoint of the first segment is offset from the centerpoint of the second segment in a direction parallel to the central axis; and wherein the radius of the first and second segments is substantially the same as the radius of the balls.

* * * * *